United States Patent
Tateishi et al.

(10) Patent No.: US 8,053,923 B2
(45) Date of Patent: Nov. 8, 2011

(54) LIGHT-EMITTING DIODE LIGHTING APPARATUS AND VEHICLE LIGHT LIGHTING APPARATUS USING THE SAME

(75) Inventors: Norikazu Tateishi, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 12/083,289

(22) PCT Filed: Aug. 14, 2006

(86) PCT No.: PCT/JP2006/316020
§ 371 (c)(1),
(2), (4) Date: Apr. 9, 2008

(87) PCT Pub. No.: WO2007/069371
PCT Pub. Date: Jun. 21, 2007

(65) Prior Publication Data
US 2009/0066262 A1    Mar. 12, 2009

(30) Foreign Application Priority Data
Dec. 12, 2005  (JP) ................................. 2005-358156

(51) Int. Cl.
*B60L 1/14* (2006.01)
(52) U.S. Cl. ..................... 307/10.8; 315/247; 315/307
(58) Field of Classification Search .............. 315/77, 315/82, 209 R, 210, 224, 225, 291, 299, 307, 315/308, 312, 324, 246, 247, 254, 255, 276, 315/277, 287; 363/65; 307/10.8
See application file for complete search history.

(56) References Cited

U.S. PATENT DOCUMENTS

| | | | | |
|---|---|---|---|---|
| 4,814,965 A * | 3/1989 | Petersen | ......................... | 363/65 |
| 5,581,160 A * | 12/1996 | Fujita | ......................... | 315/169.3 |
| 5,796,595 A * | 8/1998 | Cross | .............................. | 363/71 |
| 6,034,514 A * | 3/2000 | Sakai | ............................. | 323/225 |
| 6,437,548 B2 * | 8/2002 | Aas et al. | ...................... | 323/272 |
| 7,081,708 B2 * | 7/2006 | Ito et al. | ......................... | 315/82 |

FOREIGN PATENT DOCUMENTS

| | | |
|---|---|---|
| JP | 11-206112 A | 7/1999 |
| JP | 2000-83374 A | 3/2000 |
| JP | 2002-359090 A | 12/2002 |
| JP | 2003-59688 A | 2/2003 |
| JP | 2003-187614 A | 7/2003 |
| JP | 2003-272887 A | 9/2003 |
| JP | 2003-317978 A | 11/2003 |
| JP | 2004-51014 A | 2/2004 |

(Continued)

*Primary Examiner* — Thuy Vinh Tran
(74) *Attorney, Agent, or Firm* — Birch, Stewart, Kolasch & Birch, LLP

(57) ABSTRACT

A light emitting diode apparatus that includes a single DC/DC converter section that has two circuits connected in parallel: a flyback type boosting circuit and a boosting circuit. The former includes a transformer and a switching device and the like to boost DC voltage of a DC power supply, and the latter includes a transformer and a switching device and the like to do likewise. A control section carries out switching control of the switching devices and in such a manner that shifts from each other the phases of current Ida and current Idb to be supplied from the two boosting circuits and to a plurality of LED and the like connected in series in a light emitting section.

5 Claims, 7 Drawing Sheets

FOREIGN PATENT DOCUMENTS

| | | |
|---|---|---|
| JP | 2004-134146 A | 4/2004 |
| JP | 2004-134147 A | 4/2004 |
| JP | 2004-136719 A | 5/2004 |
| JP | 2005-27432 A | 1/2005 |
| JP | 2005-33906 A | 2/2005 |
| JP | 2005-73352 A | 3/2005 |
| JP | 2005-176513 A | 6/2005 |
| JP | 2005-206074 A | 8/2005 |

* cited by examiner

LIGHT-EMITTING DIODE LIGHTING APPARATUS AND VEHICLE LIGHT LIGHTING APPARATUS USING THE SAME

TECHNICAL FIELD

The present invention relates to a light-emitting diode lighting apparatus and a vehicle light lighting apparatus using the same capable of improving the continuity of lighting of a plurality of light-emitting diodes connected in series in lighting using a boosting type direct current/direct current converter (called "DC/DC converter" from now on).

BACKGROUND ART

Conventional lighting apparatuses using light-emitting diodes (called "LEDs" from now on) include the following:

As a first conventional example, an apparatus is known which has a plurality of LEDs connected in series, supplies the LEDs connected in series with a voltage boosted from a power supply voltage by a DC/DC converter, and causes the same current to flow through all the LEDs to light them (see Patent Document 1, for example).

As a second conventional example, an apparatus is known which employs a charge pump type boosting power supply using a capacitor, and arranges a constant current circuit using a transistor in series with an LED element to carry out constant current drive of the LED element (see Patent Document 2, for example).

As other conventional technologies relating to lighting of LEDs, the following Patent Document 3 to Patent Document 6 are known.

Patent Document 1, Japanese Patent Laid-Open No. 2003-187614;

Patent Document 2, Japanese Patent Laid-Open No. 2002-359090;

Patent Document 3, Japanese Patent Laid-Open No. 2003-317978;

Patent Document 4, Japanese Patent Laid-Open No. 2004-134146;

Patent Document 5, Japanese Patent Laid-Open No. 2004-134147; and

Patent Document 6, Japanese Patent Laid-Open No. 2005-206074.

The conventional LED lighting apparatuses have the foregoing configurations. Among them, the first conventional example (Patent Document 1) is characterized by preventing the effect due to variations in the forward voltage drops of the individual LEDs by connecting them in series, and by preventing variations in the amount of emission of the individual LEDs by equalizing the current flowing through the LEDs, thereby simplifying the circuit configuration by constructing the power supply from a single circuit.

On the other hand, LEDs, high-intensity LEDs in particular, have a high forward voltage drop of about 3 V. Accordingly, to light the plurality of LEDs connected in series, it is necessary to supply the LEDs connected in series with a voltage equal to or greater than the sum total of the forward voltage drops of the plurality of LEDs. To achieve this, the first conventional example has the boosting DC/DC converter consisting of a single circuit and boosts the power supply voltage. The boosting DC/DC converter utilizes flyback energy at energizing a coil, which repeats cycles of storing energy in the coil, first, and then discharging the energy. Thus, every cycle has timing at which the coil does not output any energy. To supply current continuously to prevent the LEDs from turning off even at the timing, the first conventional example has in parallel with the LEDs a smoothing capacitor for storing the energy once, and for discharging the energy at the timing at which the energy is not output.

Besides, the LED has forward voltage characteristics of nearly constant voltage characteristics. Thus, when the smoothing capacitor discharges its energy, the current flowing through the LED drops exponentially in accordance with the voltage drop of the smoothing capacitor due to the discharge. On the other hand, when charging the smoothing capacitor with energy, a slight increase in the voltage causes a current to flow through the constant voltage characteristic LED exponentially, thereby preventing a voltage increase of the capacitor. Thus, the capacitor cannot be charged with the energy sufficiently which is stored in accordance with (C×V×V)/2. Accordingly, to cause the current to flow through the LED stably, a large capacitance smoothing capacitor must be used to maintain the energy for a slight voltage change.

As described above, as for the configuration of connecting the smoothing capacitor in parallel with the LEDs having the constant voltage characteristics, although it is easy for the boosting circuit to make the terminal voltage to be applied to the LEDs constant, it is difficult to make the current flowing through the LEDs constant. A shortage of the capacitance of the smoothing capacitor will prevent the current from flowing constantly, and if the current flowing through the LED is intermittent, the light emitted by the LEDs is also intermittent, that is, turned on and off. Thus, the first conventional example has a problem in that the current flowing through the LEDs is intermittent, and hence the light emitted by the LEDs is also intermittent. In this case, if an object receiving the light is an object at rest, it is perceived quite normal even if it is illuminated by the blinking light source. However, if it is a moving object, it is perceived as if it were at rest for a moment because of a stroboscopic phenomenon, which is undesirable. In particular, when the LED lighting apparatus is applied to a lighting apparatus of vehicle lights such as headlights, the intermittent (blinking) lighting that causes the stroboscopic phenomenon is undesirable for driving the vehicle.

In addition, the configuration of the first conventional example, which requires a bulky capacitor as the smoothing capacitor with a large capacitance, has a problem of preventing the miniaturization of the apparatus.

As for the second conventional example (Patent Document 2), it includes, in addition to the boosting power supply, the constant current circuit for the individual LEDs. Accordingly, although the LED current does not become intermittent, when the plurality of LEDs are connected in series as in the first conventional example, the charge pump type boosting power supply of the second conventional example has the timing at which the energy is not supplied in every cycle as well. Thus, it has a problem of having a potential possibility of bringing about the stroboscopic phenomenon as in the first conventional example.

The present invention is implemented to solve the foregoing problems. Therefore it is an object of the present invention to provide, in the configuration of lighting a plurality of LEDs connected in series by using a boosting type DC/DC converter, a light-emitting diode lighting apparatus and a vehicle light lighting apparatus using the same capable of preventing the current flowing through the LEDs from becoming intermittent and the light emitted by the LEDs from becoming intermittent, and capable of reducing the size and price using a smoothing capacitor with small capacitance or without using a smoothing capacitor, thereby preventing a large-sized, large-capacitance smoothing capacitor from being used, and simplifying the circuit configuration.

DISCLOSURE OF THE INVENTION

The light-emitting diode lighting apparatus in accordance with the present invention includes a light emitting section having a plurality of light-emitting diodes connected in series; a DC/DC converter section having a plurality of boosting circuits connected in parallel for boosting the voltage of a DC power supply and produces a single output; and a control section for driving the plurality of boosting circuits at the same period, and for carries out control in such a manner as to shift the individual phases from each other.

As described above, according to the present invention, the apparatus is configured in such a manner that the plurality of boosting circuits for boosting the voltage of the DC-power supply are connected in parallel, output the current alternately, and supply the current to the LEDs. This makes it possible to eliminate the period in which the current flowing through the plurality of LEDs connected in series becomes zero. Thus, it can prevent the light emission of the LEDs from becoming intermittent due to the intermittent LED current as in the conventional apparatus, thereby being able to prevent the occurrence of the stroboscopic phenomenon.

In addition, the circuit configuration is simple, and the conventionally used large-sized large-capacitance smoothing capacitor can be replaced by a small capacitance or removed. Accordingly, the reduction in size and price of the apparatus can be implemented.

BEST MODE FOR CARRYING OUT THE INVENTION

The best mode for carrying out the invention will now be described with reference to the accompanying drawings to explain the present invention in more detail.

Embodiment 1

Figure 1:
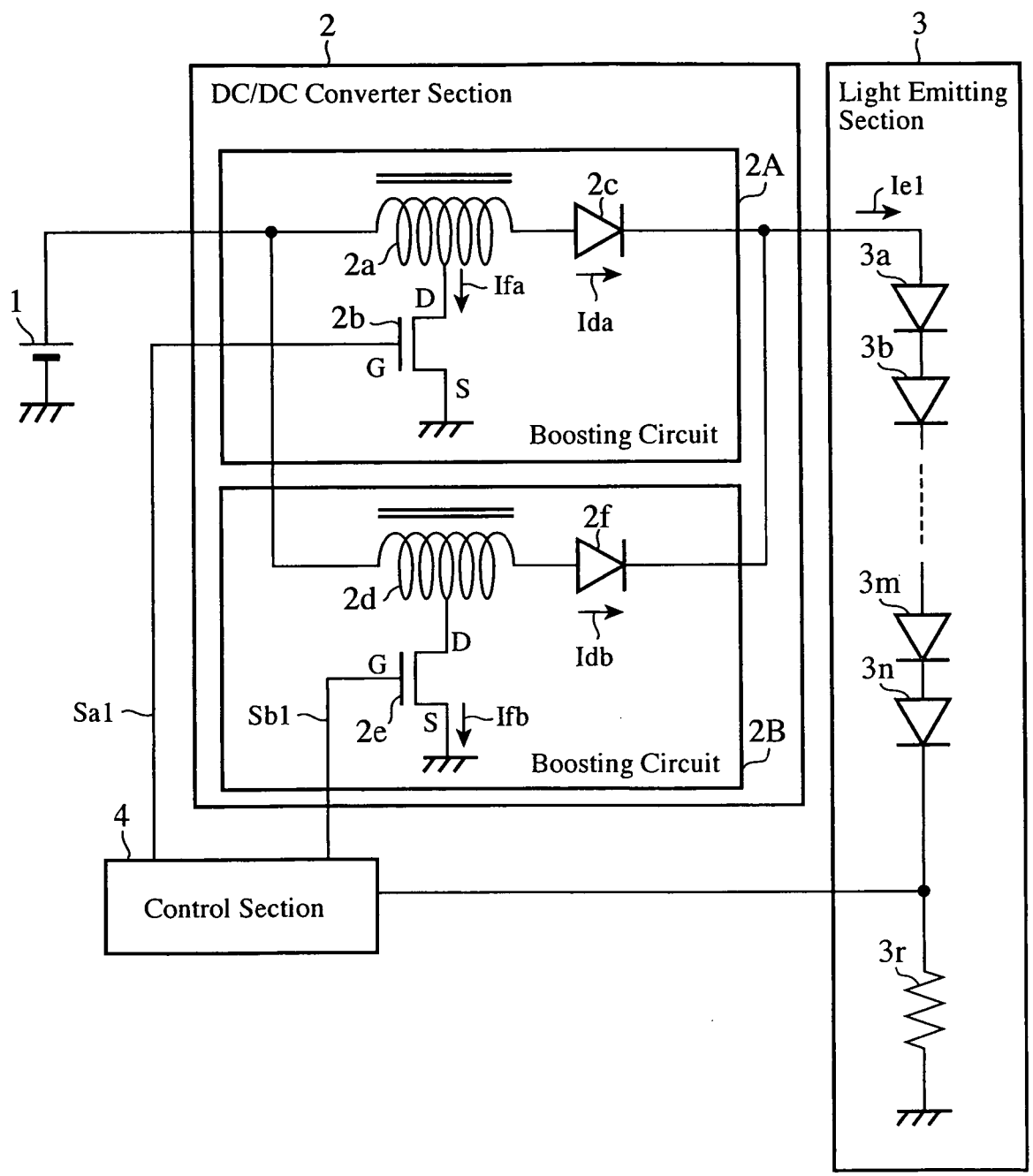
FIG. 1 is a diagram showing a configuration of the light-emitting diode lighting apparatus of an embodiment 1 in accordance with the present invention.

FIG. 1 is a diagram showing a configuration of the light-emitting diode lighting apparatus of an embodiment 1 in accordance with the present invention.

In FIG. 1, the light-emitting diode lighting apparatus is constructed from four main divisions of a DC power supply 1, a DC/DC converter section 2, a light emitting section 3 and a control section 4.

In the configuration, the DC power supply 1 is a battery loaded on a vehicle, for example.

The DC/DC converter section 2 comprises a plurality of boosting circuits connected in parallel for boosting the voltage of the DC power supply 1, and supplies a current to light-emitting diodes in the light emitting section 3. The DC/DC converter section 2 as shown in FIG. 1 comprises two flyback type circuits, a boosting circuit 2A and a boosting circuit 2B, connected in parallel.

The two boosting circuits 2A and 2B have the same configuration: the first boosting circuit 2A is composed of a single-winding (coil) boosting transformer 2a, a switching device 2b using an FET (field-effect transistor), and a diode 2c; and the second boosting circuit 2B is composed of a transformer 2d with the same form as the transformer 2a, a switching device 2e using an FET, and a diode 2f. The transformers 2a and 2d each have their first terminal connected to the positive potential side of the DC power supply 1. The transformer 2a has its second terminal connected to the anode of the diode 2c, and the transformer 2d has its second terminal connected to the anode of the diode 2f. The diodes 2c and 2f each have their cathode connected to the light emitting section 3. In addition, the transformer 2a has its tap connected to the drain (D) of the switching device (FET) 2b whose source (S) is grounded. Likewise, the transformer 2d has its tap connected to the drain (D) of the switching device 2e (FET) whose source (S) is grounded. The switching devices 2b and 2e have their gates (G) connected to the control section 4 to received switching control signals Sa1 and Sb1 the control section 4 generates.

The light emitting section 3 has a plurality of LEDs (3a, 3b, . . . 3m, 3n, which will be called "LED 3a and the like" from now on) connected in series. The series connection has its anode side connected to the cathodes of the diodes 2c and 2f, the output terminal of the boosting section 2, and its cathode side grounded via a resistor 3r. Thus, the series connection is supplied with power from the boosting section 2, thereby emitting light at the same current.

Figure 2:
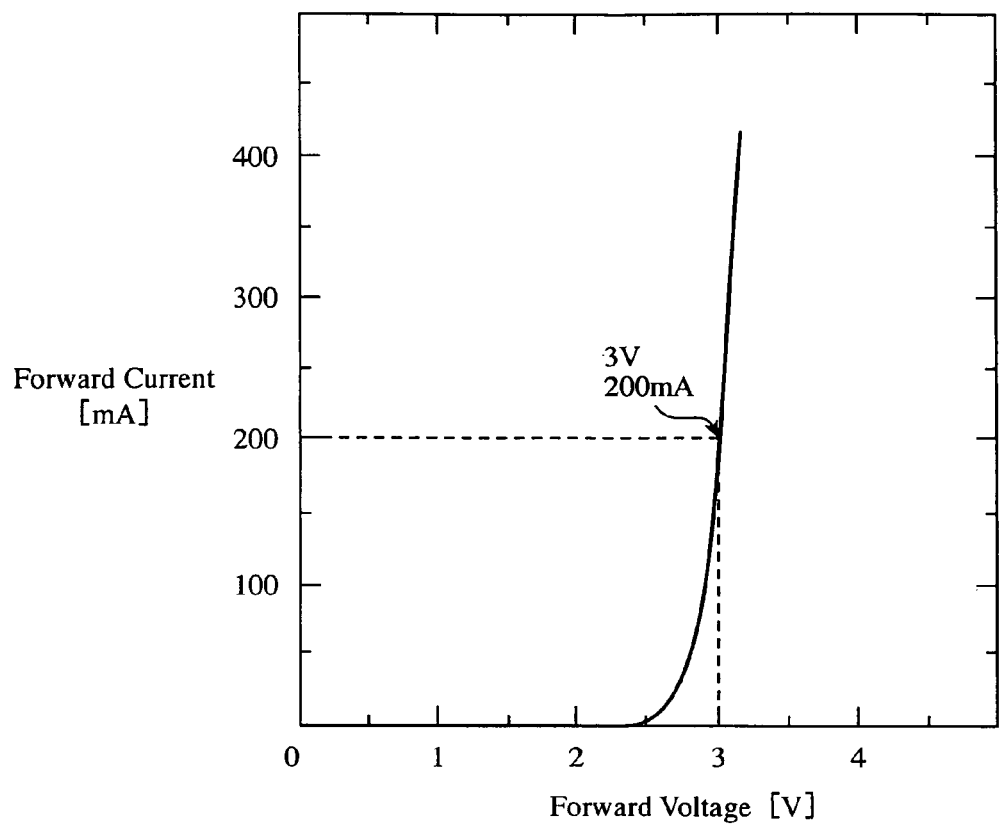
FIG. 2 is a graph illustrating characteristics of a single LED used for the light-emitting diode lighting apparatus of the embodiment 1 in accordance with the present invention.

FIG. 2 illustrates a characteristic example of one of the LEDs constituting the light emitting section 3.

FIG. 2 is a graph illustrating the characteristics of a single LED.

FIG. 2 illustrates the relationships between the forward voltage (V) (horizontal axis) versus the forward current (mA) (vertical axis). The LED has the forward current varying exponentially for the forward voltage, and thus has constant voltage characteristics in general. Accordingly, the forward current (flow-through current) varies sharply in response to variations of the forward voltage (applied voltage). Therefore, to stabilize the light emission of the LEDs, it is necessary to suppress fluctuations of the forward voltage (applied voltage) as much as possible so as to suppress the fluctuations of the forward current (flow-through current) to stabilize.

In addition, as for the high-intensity LEDs, when the forward current is 200 mA as shown in FIG. 2, for example, the forward voltage drop is about 3 V. Thus, the configuration having a plurality of LEDs connected in series requires a boosting power supply that can supply a voltage equal to or greater than the sum total of the forward voltage drops of the LEDs connected in series.

The control section 4 generates the same frequency (the same period) switching control signals Sa1 and Sb1 in such a manner as to make the voltage across the resistor 3r constant (constant current control), and delivers them to the individual gates (G) of the switching devices 2b and 2e of the boosting circuits 2A and 2B, respectively. The switching control signals Sa1 and Sb1 carry out the switching (on and off) control of the switching devices 2b and 2e. In this case, the switching timing of the on and off control of the switching device 2b is shifted from that of the switching device 2e (which will be described later)

Next, the operation of FIG. 1 will be described with reference to FIG. 3.

Figure 3:
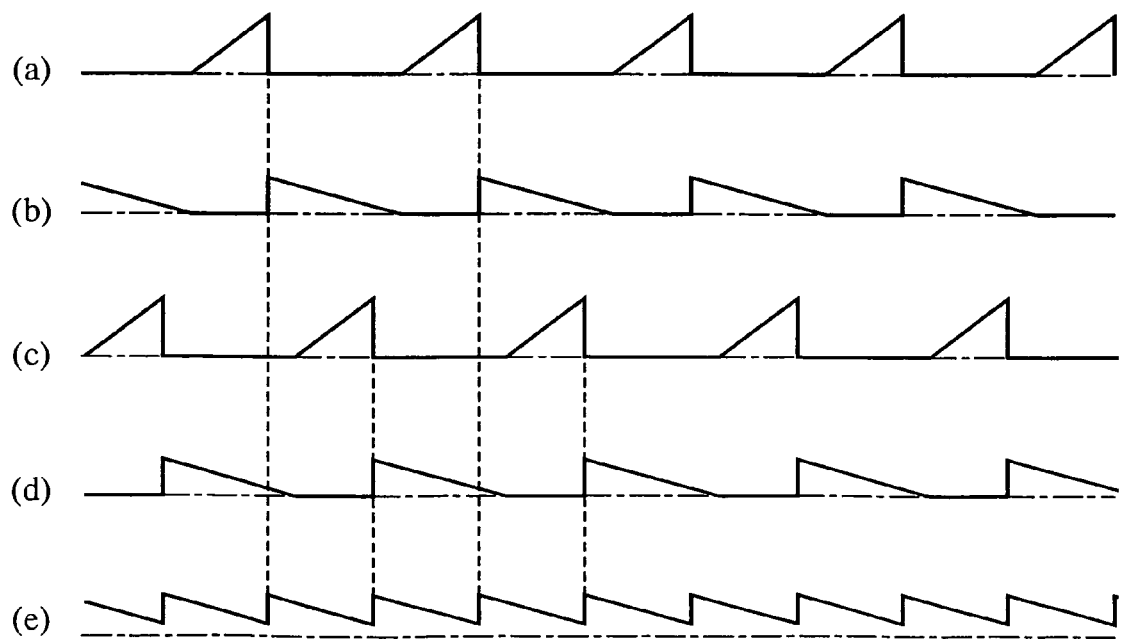
FIG. 3 is a timing chart illustrating the operation of the light-emitting diode lighting apparatus of the embodiment 1 in accordance with the present invention: (a) is a waveform diagram of a current flowing through a switching device; (b) is a waveform diagram of a current flowing through a diode; (c) is a waveform diagram of a current flowing through a switching device; (d) is a waveform diagram of a current flowing through a diode; and (e) is a waveform diagram of a current flowing through LEDs.

FIG. 3 is a timing chart illustrating the operation of the light-emitting diode lighting apparatus of the embodiment 1 in accordance with the present invention: FIG. 3(a) is a waveform diagram of the current flowing through the switching device 2b; FIG. 3(b) is a waveform diagram of the current flowing through the diode 2c; FIG. 3(c) is a waveform diagram of the current flowing through the switching device 2e; FIG. 3(d) is a waveform diagram of the current flowing through the diode 2f; and FIG. 3(e) is a waveform diagram of a current flowing through the LED 3a and the like of the light emitting section 3.

The control section 4 generates the same frequency switching control signals Sa1 and Sb1 having their phases shifted by a predetermined amount, and supplies the switching control signal Sa1 to the gate (G) of the switching device 2b and the switching control signal Sb1 to the gate (G) of the switching device 2e.

The switching device 2b of the DC/DC converter section 2 undergoes the switching control by the switching control signal Sa1 fed to its gate (G), thereby turning on and off the current across the drain (D) and source (S). The turning on and off causes the voltage supply from the DC power supply 1 to the transformer 2a to be turned on and off. In addition, the turning on and off causes the switching current (drain current) Ifa with a waveform of FIG. 3(a) to flow through the switching device 2b.

As described above, the voltage supply to the boosting transformer 2a is turned on and off by the switching device. 2b. Thus, the boosting transformer 2a stores energy fed from the DC power supply 1 during the on state of the switching device 2b, and generates to the diode 2c side the flyback voltage based on the stored energy at the time when the switching device 2b makes a transition from the on state to the off state. The flyback voltage causes the diode current Ida with a waveform of FIG. 3(b) to flow through the diode 2c. In this way, the diode 2c outputs from its cathode side the DC voltage obtained by boosting the DC voltage fed from the DC power supply 1.

As for the transformer 2d, switching device 2e and diode 2f constituting the second boosting circuit 2B, they operate in the same manner as the transformer 2a, switching device 2b and diode 2c constituting the first boosting circuit 2A. Thus, the switching current (drain current) Ifb with a waveform of FIG. 3(c) flows through the switching device 2e, and the diode current Idb with a waveform of FIG. 3(d) flows through the diode 2f. In addition, the diode 2f outputs from its cathode side the DC voltage obtained by boosting the DC voltage fed from the DC power supply 1.

As mentioned before, the switching control signal Sa1 and the switching control signal Sb1, which have the same frequency, have their phases shifted from each other. Accordingly, as for the switching current Ifa of FIG. 3(a) and the switching current Ifb of FIG. 3(c), although they have the same frequency, their phases are shifted. Thus, the diode current Ida of FIG. 3(b) and the diode current Idb of FIG. 3(d) have their phases shifted. As shown in FIGS. 3(b) and 3(d), their phases have such relationships that during the time when the first diode current does not flow, the second diode current flows. The phase relationships between the switching control signal Sa1 and the switching control signal Sb1 are determined to bring about such phase relationships.

Both the diode current Ida and diode current Idb with the foregoing phase relationships flow through the LED 3a and the like of the light emitting section 3 as the LED current Ie1. The LED current Ie1 becomes a current with a waveform of FIG. 3(e).

As described before, when the diode current Ida (or diode current Idb) stops flowing, the diode current Idb (or diode current Ida) starts flowing. Accordingly, the LED current Ie1 does not have a period in which "current becomes zero" as shown in FIG. 3(e). This makes it possible to prevent the LED 3a and the like from emitting light intermittently owing to the intermittent LED current, thereby being able to prevent the occurrence of the stroboscopic phenomenon.

As described above, although the boosting circuits 2A and 2B are constructed from the transformers 2a and 2d in the configuration of FIG. 1, choke coils can also be used depending on the output voltage.

In addition, although the configuration of FIG. 1 described above has two boosting circuits connected in parallel, it is not limited to two circuits. For example, it can be composed of three or more circuits. In this case, the phases of the individual currents to be supplied from the individual boosting circuits to the light emitting section 3 are shifted from each other as described before. This makes it possible to further prevent the LED 3a and the like from emitting light intermittently.

As described above, the present embodiment 1 is configured in such a manner that the single DC/DC converter is constructed from the two boosting circuits connected in parallel, namely, the flyback type boosting circuit 2A composed of the transformer 2a, switching device 2b and the like for boosting the DC voltage of the DC power supply 1, and the flyback type boosting circuit 2B constructed from the transformer 2d, switching device 2e and the like for boosting the DC voltage of the DC power supply 1; and the control section 4 carries out the switching control of the switching devices 2b and 2e in such a manner as to shift from one another the phases of the current Ida and current Idb to be supplied from the two boosting circuits to the LED 3a and the like of the light emitting section 3, which are connected in series. Accordingly, the current Ie1 flowing through the LED 3a and the like connected in series does not have a period in which it becomes zero. This makes it possible to prevent the intermittent light emission of the LEDs due to the intermittent LED current as in the conventional example, thereby being able to prevent the occurrence of the stroboscopic phenomenon.

In addition, the single DC/DC converter, which has to have large capacity originally, is divided into the two boosting circuits 2A and 2B which have a simple circuit configuration and low capacity, and which obviate the need for the large-sized large-capacitance smoothing capacitor conventionally used. This enables reducing the size and price of the apparatus.

In addition, the configuration having the two separate boosting circuits 2A and 2B makes it possible to divide up the current to be supplied from the DC power supply 1, which is an intermittent large current conventionally, into continuous smaller currents. Thus, it can reduce the radio noise produced from the DC/DC converter, and reduce the peak current flowing through the individual power components such as the switching device 2b constituting the boosting circuit 2A and the like, thereby being able to improve the efficiently of the DC/DC converter.

Embodiment 2

Figure 4:
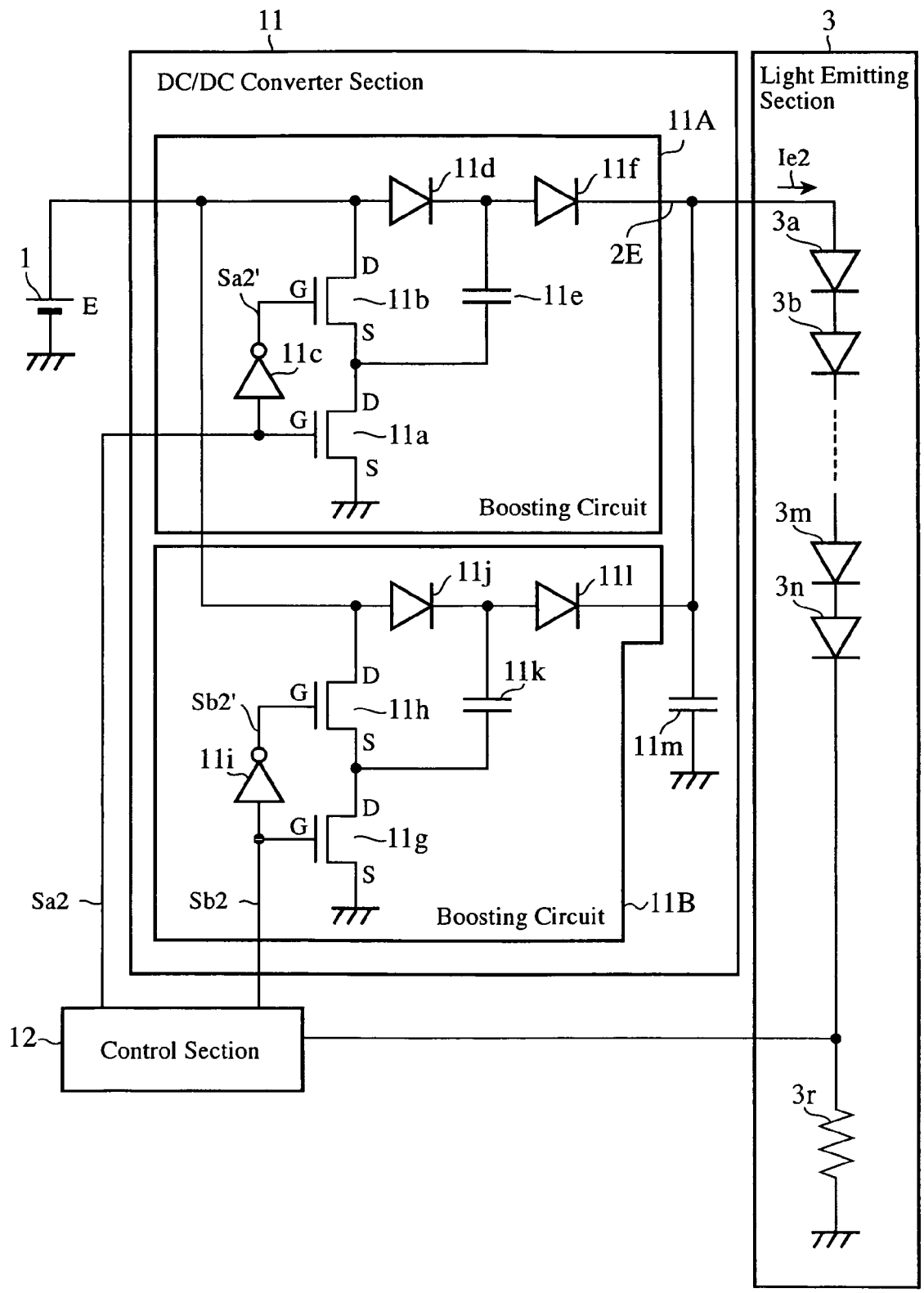
FIG. 4 is a diagram showing a configuration of the light-emitting diode lighting apparatus of an embodiment 2 in accordance with the present invention.

FIG. 4 is a diagram showing a configuration of the light-emitting diode lighting apparatus of an embodiment 2 in accordance with the present invention. In FIG. 4, the same components as those of FIG. 1 are designated by the same reference symbols, and their description will be omitted here.

In FIG. 4, the configuration of FIG. 4 differs from that of FIG. 1 in the configuration of the DC/DC converter section 11 for boosting the voltage of the DC power supply 1. The DC/DC converter section 2 of FIG. 1 is constructed by connecting the two flyback type boosting circuits in parallel. In contrast with this, the DC/DC converter section 11 of FIG. 4 is constructed by connecting two charge pump type boosting circuits 11A and 11B in parallel. The charge pump type boosting circuit is a circuit for boosting by superimposing the voltage charged in the capacitor on the power supply voltage, and has a feature of not employing the transformers 2a and 2d as shown in FIG. 1.

The first charge pump type boosting circuit 11A of the two circuits connected in parallel includes a switching device 11a, a switching device 11b, an inverter 11c, a diode 11d, a capacitor 11e and a diode 11f. Likewise, the second charge pump type boosting circuit 11B includes a switching device 11g, a switching device 11h, an inverter 11i, a diode 11j, a capacitor 11k and a diode 11l. In addition, a capacitor 11m is provided for common use by the two charge pump type boosting circuits 11A and 11B.

The drain (D) of the switching device 11b, the anode of the diode 11d, the drain (D) of the switching device 11h and the anode of the diode 11j are connected to the positive potential side of the DC power supply 1. The inverter 11c is connected between the gate (G) of the switching device 11a and the gate (G) of the switching device 11b, and the source (S) of the switching device 11a is grounded. The source (S) of the switching device 11b is connected to the drain (D) of the switching device 11a, and the connection point is connected to a first terminal of the capacitor 11e. A second terminal of the capacitor 11e is connected to the cathode of the diode 11d and the anode of the diode 11f. As for the other switching device 11g, switching device 11h, inverter 11i, diode 11j, capacitor 11k and diode 11l, the same connecting relationships are established.

The gate (G) of the switching device 11a connected to the input terminal of the inverter 11c and the gate (G) of the switching device 11g connected to the input terminal of the inverter 11i are connected to the control section 12, and receive the switching control signals Sa2 and Sb2 the control section 12 generates.

The cathodes of the diode 11f and diode 11l, which constitute the output terminal of the DC/DC converter section 11, are connected to the second terminal of the capacitor 11m whose first terminal is grounded, and to the anode side of the LED 3a and the like connected in series, which constitute the light emitting section 3.

The control section 12 generates the same frequency switching control signals Sa2 and Sb2 in such a manner as to make the voltage across the resistor 3r constant (constant current control), and delivers them to the gates (G) of the switching devices 11a and 11g of the boosting circuits 11A and 11B, and to the gates (G) of the switching devices 11b and 11h via the inverters 11c and 11i. The switching control signals Sa2 and Sb2 carry out the switching (on and off) control of the switching devices 11a and 11b and of the switching devices 11g and 11h. In this case, the switching timing of the on and off control of the switching devices 11a and 11b is shifted from that of the switching devices 11g and 11h as in the configuration of FIG. 1.

Next, the operation of FIG. 4 will be described.

The control section 12 generates the same frequency switching control signals Sa2 and Sb2 having their phases shifted by a predetermined amount, and supplies the switching control signal Sa2 to the gate (G) of the switching device 11a and the switching control signal Sb2 to the gate (G) of the switching device 11g. In addition, the switching control signal Sa2' passing through the phase inversion by the inverter 11c is supplied to the gate (G) of the switching device 11b, and the switching control signal Sb2' passing through the phase inversion by the inverter 11i is supplied to the gate (G) of the switching device 11h. The phase inversion by the inverters 11c and 11i brings one of the switching devices 11a and 11b into the on state and the other of them into the off state. As for the switching devices 11g and 11h, the relationships hold true in the same manner.

As for the switching devices 11a and 11b, when the switching device 11a is brought into the on state by the switching control signal Sa2, the switching device 11b is brought into the off state. Thus, the capacitor 11e is grounded via the drain (D) and source (S) of the switching device 11a so that the capacitor 11e is charged with the voltage E fed from the DC power supply 1 via the diode 11d. Subsequently, when the switching device 11a is brought into the off state by the switching control signal Sa2, the switching device 11b is brought into the on state. Thus, the voltage E charged in the capacitor 11e is superimposed (charge pumped) on the voltage E fed from the DC power supply 1 via the drain (D) and source (S) of the on state switching device 11b. As a result, at the cathode side of the diode 11d, the voltage 2E is obtained which is boosted to double the voltage E of the DC power supply 1. The boosted voltage 2E is stored in the capacitor 11m via the diode 11f. In this case, the discharge from the capacitor 11e to the DC power supply 1 is inhibited by the inverse characteristic of the diode 11d, and the discharge from the capacitor 11m to the capacitor 11e is inhibited by the inverse characteristic of the diode 11f.

As for the switching device 11g, switching device 11h, diode 11j, capacitor 11k, diode 11l constituting the second boosting circuit 11B, they operate in the same manner as the switching device 11a, switching device 11b and the like constituting the first boosting circuit 11A as described above.

As mentioned before, the switching control signal Sa2 and the switching control signal Sb2, which have the same frequency, have their phases shifted as in the configuration of FIG. 1. Accordingly, the operation of the charge pumps, which superimpose the voltage across the charged capacitors on the power supply voltage, deviates, and the current flowing through the diode 11*f* and the current flowing through the diode 11*l* have different phases from one another. The phase relationships between the two currents are such that the second diode current complements the reduction in the first diode current as in the configuration of FIG. 1. To achieve such phase relationships, the phase relationships between the switching control signal Sa2 and the switching control signal Sb2 are set in advance.

Both the current of the diode 11*f* and the current of the diode 11*l* having the foregoing phase relationships flow through the LED 3*a* and the like of the light emitting section 3 as the LED current Ie2. Thus, the LED current Ie2 does not have a period in which "current becomes zero" just as the current with the waveform of FIG. 3(*e*) in the configuration of FIG. 1. This makes it possible to prevent the LED 3*a* and the like from emitting light intermittently owing to the intermittent LED current, thereby being able to prevent the occurrence of the stroboscopic phenomenon.

Although the configuration of FIG. 4 described above has two boosting circuits connected in parallel, it is not limited to two circuits. For example, it can be composed of three or more circuits as in the embodiment 1. In this case, by shifting from each other the phases of the individual currents to be supplied from the individual boosting circuits to the light emitting section 3, it is possible to further prevent the LED 3*a* and the like from emitting light intermittently.

As described above, the present embodiment 2 is configured in such a manner that the single DC/DC converter is constructed from the two boosting circuits connected in parallel, namely, the charge pump type boosting circuit 11A composed of the switching devices 11*a* and 11*b*, capacitor 11*e* and the like for boosting the DC voltage of the DC power supply 1, and the charge pump type boosting circuit 11B composed of the switching devices 11*g* and 11*h*, capacitor 11*k* and the like for boosting the DC voltage of the DC power supply 1; and the control section 12 carries out the switching control of the switching devices 11*a* and 11*b* and switching devices 11*g* and 11*g* in such a manner as to shift from each other the phases of the currents to be supplied from the two boosting circuits to the LED 3*a* and the like of the light emitting section 3, which are connected in series. Accordingly, the present embodiment 2 offers the same advantage as the embodiment 1, that is, it can eliminate the period in which the current Ie2 flowing through the LED 3*a* and the like connected in series becomes zero; prevent the intermittent light emission of the LEDs due to the intermittent LED current; and prevent the occurrence of the stroboscopic phenomenon.

In addition, the charge pump type DC/DC converters of the present embodiment 2 can double the voltage of the DC power supply 1 with a simple circuit configuration without using a boosting transformer. Thus, it is particularly effective for the lighting apparatus that has a rather small number of LEDs connected in series in the light emitting section 3, and requires a rather low voltage for lighting the LEDs.

Furthermore, as the embodiment 1, the present embodiment 2 divides the single DC/DC converter section 11 into the two boosting circuits 11A and 11B that have a simple circuit configuration and a low capacitance, and replaces the large-sized large-capacitance smoothing capacitor by a small capacitance. Thus, it can reduce the size and price of the apparatus.

Besides, as in the embodiment 1, the configuration having the two separate boosting circuits 11A and 11B makes it possible to divide up the current to be supplied from the DC power supply 1, which is an intermittent large current conventionally, into continuous small currents. Thus, it can reduce the peak current flowing through the individual power components such as the switching device 11*a* constituting the boosting circuit 11A and the like, thereby being able to improve the efficiently of the DC/DC converter.

Embodiment 3

Figure 5:
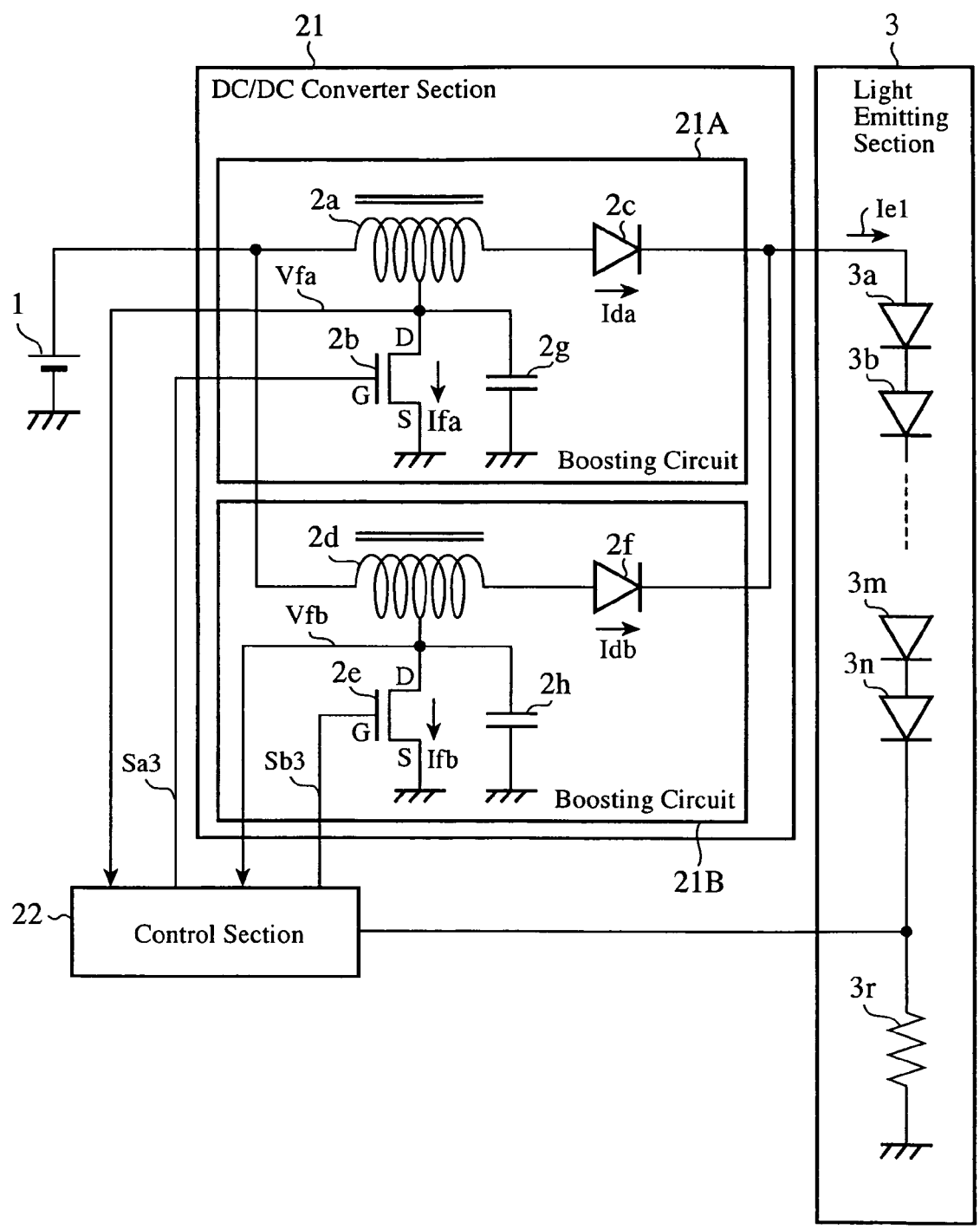
FIG. 5 is a diagram showing a configuration of the light-emitting diode lighting apparatus of an embodiment 3 in accordance with the present invention.

FIG. 5 is a diagram showing a configuration of the light-emitting diode lighting apparatus of an embodiment 3 in accordance with the present invention. In FIG. 5, the same components as those of FIG. 1 are designated by the same reference symbols, and their description will be omitted here.

In FIG. 5, the configuration of FIG. 5, which includes a DC/DC converter section 21 having two resonance type boosting circuits 21A and 21B similar to their counterparts of FIG. 1 connected in parallel, differs from the configuration of FIG. 1 in the following: it has a resonance capacitor 2*g* between the connection point of the tap of the transformer 2*a* and the drain (D) of the switching device 2*b* and the ground; has a resonance capacitor 2*h* in the same way between the connection point of the tap of the transformer 2*d* and the drain (D) of the switching device 2*e* and the ground; and connects the individual drains (D) of the switching devices 2*b* and 2*e* to the control section 22. The remaining configuration is the same as that of FIG. 1. Accordingly, the basic operation of FIG. 5 is common to that of FIG. 1. Thus, the following description will be made with placing particular emphasis on the foregoing different points with omitting or abbreviating the operation common to FIG. 1.

Next, the operation of FIG. 5 will be described with reference to FIG. 6.

Figure 6:
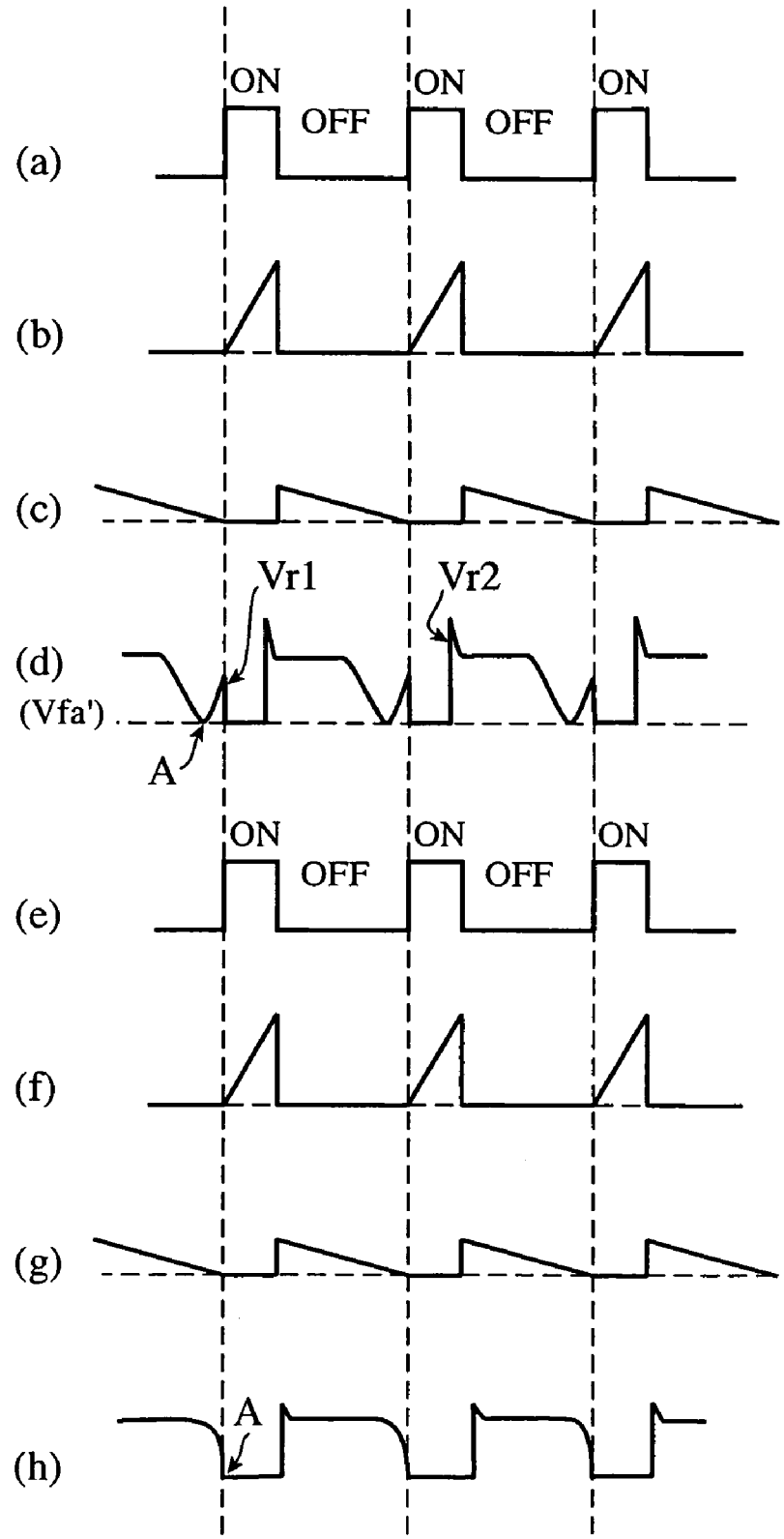
FIG. 6 is a timing chart illustrating the operation of the light-emitting diode lighting apparatus of the embodiment 3 in accordance with the present invention in which (a)-(d) relate to a configuration having no resonance capacitor and (e)-(h) relate to the configuration of FIG. 5 having the resonance capacitor: (a) and (e) are a switching timing diagram of the switching device in response to a switching control signal; (b) and (f) are a waveform diagram of a current flowing through the switching device; (c) and (g) are a waveform diagram of a current flowing through the diode; and (d) and (h) are a waveform diagram of a voltage at the drain (D) of the switching device.

FIG. 6 is a timing chart illustrating the operation of the light-emitting diode lighting apparatus of the embodiment 3 in accordance with the present invention in which FIG. 6(*a*)-FIG. 6(*d*) relate to a configuration having no resonance capacitor 2*g* and FIG. 6(*e*)-FIG. 6(*h*) relate to a configuration of FIG. 5 having the resonance capacitor 2*g*: FIG. 6(*a*) and FIG. 6(*e*) are a switching timing diagram of the switching device 2*b* in response to a switching control signal Sa3; FIG. 6(*b*) and FIG. 6(*f*) are a waveform diagram of a current flowing through the switching device 2*b*; FIG. 6(*c*) and FIG. 6(*g*) are a wave form diagram of a current flowing through the diode 2*c*; and FIG. 6(*d*) and FIG. 6(*h*) are a waveform diagram of a voltage at the drain (D) of the switching device 2*b*.

Assume that the resonance capacitor 2*g* is not provided. Then, the switching device 2*b* turns on and off at the timing as shown in FIG. 6(*a*) in response to the switching control signal Sa3. The turning on and off causes the switching current (drain current) Ifa with a waveform of FIG. 6(*b*) to flow through the switching device 2*b* in the same manner as described in FIG. 3. Thus, the diode current Ida with a waveform of FIG. 6(*c*) flows through the diode 2*c*.

In the foregoing operation, at the timing the switching device 2*b* turns from an off to on state in response to the switching control signal Sa3, the waveform of its drain (D) voltage (designated by Vfa') has oscillation (ringing) as shown in FIG. 6(*d*). If the oscillation component is short-circuited (Vr1) abruptly, a surge voltage is produced at the timing the switching device 2*b* turns from an on to off state in response to the switching control signal Sa3. The sudden rise (Vr2) of this surge voltage causes noise, and it is undesirable for the lighting apparatus.

The resonance capacitor 2g is provided for the purpose of preventing the sudden voltage changes of Vr1 and Vr2. The operation of the configuration of FIG. 5 including the resonance capacitor 2g will be described below.

The resonance capacitor 2g resonates with the inductance (L) of the transformer 2a, and the resonance makes the frequency of the oscillation component lower. In this case, the resonance capacitor 2g is charged with the voltage fed from the transformer 2a, and the charge voltage is discharged to the ground side via the drain (D) and the source (S) when the switching device 2b is in the on state. The discharge means disposing of the energy stored, and can cause heat or a switching loss of the switching device 2b, which is undesirable from the viewpoint of the efficiency of the DC/DC converter. For this reason, the switching device 2b is turned on at the timing the energy stored in the transformer 2a is released to the light emitting section 3 side, that is, at the timing synchronized with the timing the current Ifa flowing through the switching device 2b or the voltage Vfa applied becomes zero.

More specifically, the switching device 2b is turned on at the timing "A" shown in FIGS. 6(d) and 6(h), at which the drain (D) voltage of the switching device 2b falls to zero.

This makes it possible to reduce the discharge from the resonance capacitor 2g, to avoid the inefficient operation of disposing of the voltage (energy) charged, thereby suppressing the heat generation due to the switching loss of the switching device 2b.

Incidentally, the temperature for causing the LEDs to emit light appropriately is not so high (100° C., for example). Therefore it is important for lighting the LEDs to take an appropriate step for heat sinking. Thus, the foregoing suppression of the heat generation due to the switching loss of the switching device 2b is desirable for the lighting apparatus.

To turn on the switching device 2b at the timing "A" positively, the control section 22 monitors voltage conditions at the drain (D) of the switching device 2b, generates the switching control signal Sa3 of FIG. 6(e) for turning on the switching device 2b at the timing "A", and delivers it to the gate (G) of the switching device 2b.

After that, as in the configuration of FIG. 1, the switching device 2b is turned on and off in response to the switching control signal Sa3. Thus, the switching current (drain current) Ifa with the waveform of FIG. 6(f) flows through the switching device 2b and the diode current Ida with the waveform of FIG. 6(g) flows through the diode 2c.

In addition, the voltage Vfa at the drain (D) of the switching device 2b becomes the voltage with a waveform of FIG. 6(h), which prevents the generation of the oscillation components or sudden voltage changes of FIG. 6(d), which can cause the noise and heat.

As for the transformer 2d, switching device 2e, diode 2f and resonance capacitor 2h constituting the second boosting circuit 21B, they operate in the same manner as the transformer 2a, switching device 2b, diode 2c and resonance capacitor 2g constituting the first boosting circuit 21A. Thus, as for the switching timing in response to the switching control signal Sb3, the switching current Ifb, the diode current Idb and the voltage Vfb at the drain (D) of the switching device 2e, they have the same waveforms as their counterparts of FIG. 6(e)-FIG. 6(h) mentioned above, but have their phases shifted. The phase shift is due to the phase shift between the switching control signal Sa3 and the switching control signal Sb3, which have the same frequency, as in the configuration of FIG. 1.

Accordingly, as for the LED current Ie1 flowing through the LED 3a and the like in the light emitting section 3 from the DC/DC converter section 21, it is the same as in the configuration of FIG. 1. This makes it possible to prevent the LED 3a and the like from emitting light intermittently owing to the intermittent LED current, thereby being able to prevent the occurrence of the stroboscopic phenomenon.

Although the configuration of FIG. 5 described above has two boosting circuits connected in parallel, it is not limited to two circuits. For example, it can be composed of three or more circuits as in the embodiment 1. In this case, by shifting the phases of the individual currents to be supplied from the individual boosting circuits to the light emitting section 3 from each other, it becomes possible to further prevent the LED 3a and the like from emitting light intermittently.

As described above, the present embodiment 3 is configured in such a manner that the resonance type boosting circuits are connected in parallel which consist of the two boosting circuits of the embodiment 1 (FIG. 1) plus the resonance capacitor 2g and resonance capacitor 2h, respectively; and the control section 22 carries out the switching control in such a manner as to turn on the switching devices 2b and 2e at the timing their drain (D) voltages drop to zero, and carries out the remaining switching control in the same manner as the control section 4 of the embodiment 1. Thus, the present embodiment 3 offers the same advantages as the embodiment 1, that is, it can eliminate the period in which the current Ie1 flowing through the LED 3a and the like connected in series becomes zero. This makes it possible to prevent the intermittent light emission of the LEDs due to the intermittent LED current, thereby being able to prevent the occurrence of the stroboscopic phenomenon. In addition, providing the resonance capacitors 2g and 2h makes it possible to suppress the oscillation component generated at their drains (D) when the switching devices 2b and 2e turn from an off to on state, thereby being able to prevent the noise generation due to the oscillation component. Furthermore, the control section 22 carries out the switching control in such a manner as to turn on the switching devices 2b and 2e at the timing their drain (D) voltages fall to zero. This makes it possible to reduce the discharge of the resonance capacitors 2g and 2h, and to reduce the heat generation owing to the switching loss of the switching devices 2b and 2e due to the discharge, thereby being able to improve the efficiency as the DC/DC converter.

The advantages other than those described above are as follows. The advantage of being able to reduce the size and price of the apparatus by dividing the single DC/DC converter into two boosting circuits having a simple circuit configuration and a low capacitance. In addition, the advantage resulting from the configuration having the two separate boosting circuits is as follows: the current to be supplied from the DC power supply 1, which is an intermittent large current conventionally, can be divided up into continuous small currents; the peak current flowing through the individual power components such as the switching device 2b constituting the DC/DC converter can be reduced; and the efficiently of the DC/DC converter can be improved. These advantages are the same as those of the embodiment 1

Embodiment 4

Figure 7:
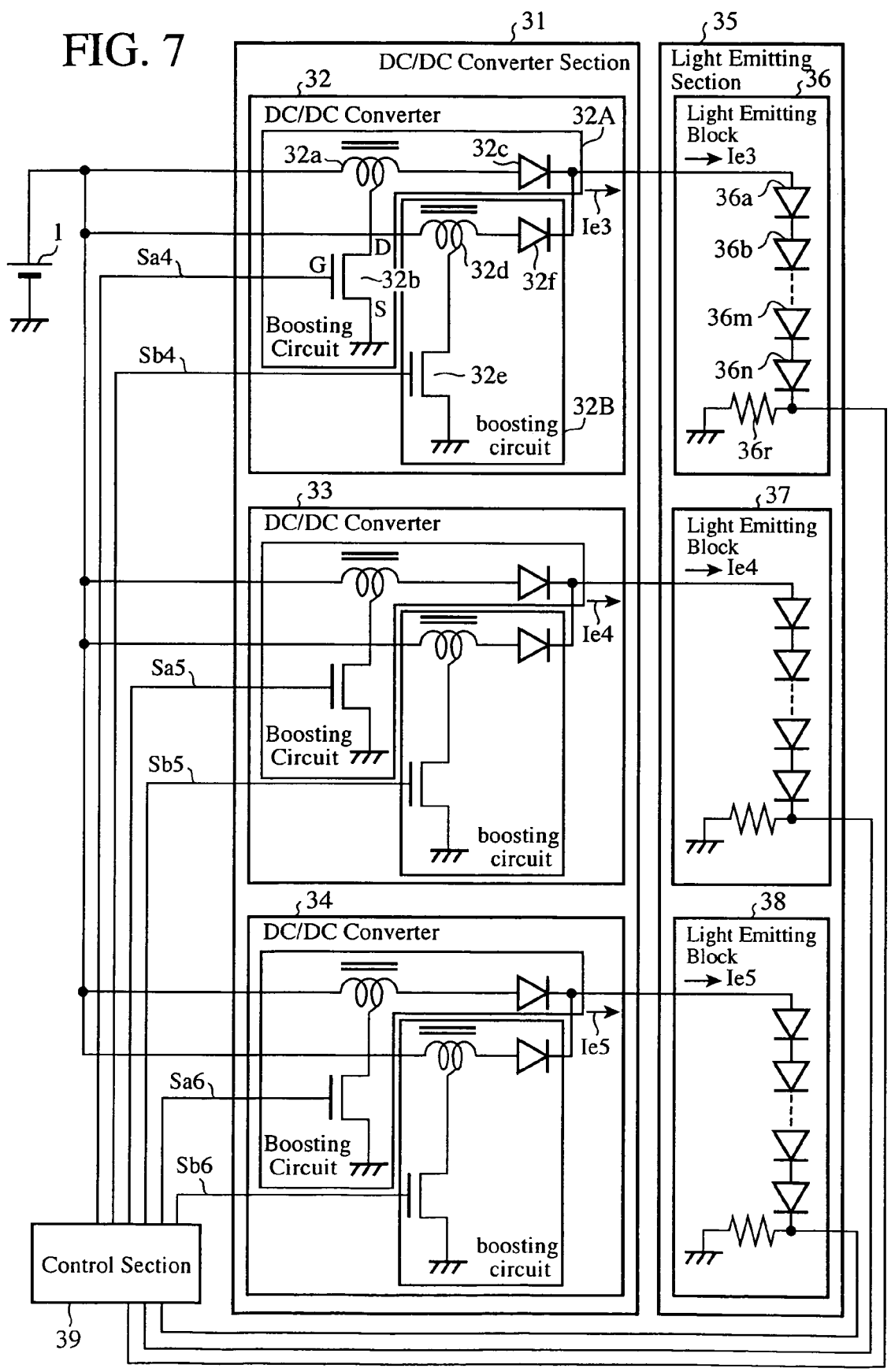
FIG. 7 is a diagram showing a configuration of the light-emitting diode lighting apparatus of an embodiment 4 in accordance with the present invention.

FIG. 7 is a diagram showing a configuration of the light-emitting diode lighting apparatus of an embodiment 4 in accordance with the present invention.

The light emitting section 3 of the light-emitting diode lighting apparatus of the foregoing embodiments 1-3 consists of a single block of a plurality of LEDs connected in series. In this configuration, if a large number of LEDs (45, for example) are connected in series to carry out high-intensity light emission, since the forward voltage drop of the LEDs is high voltage of about 3 V as described in FIG. 2, a DC/DC converter is required which generates the high voltage equal to or greater than the sum total of the forward voltage drops of the LEDs connected in series.

A DC/DC converter for generating such high voltage will require high-voltage components that will result in an increase in the cost and size of the apparatus because of an increase in the size of the components, which is undesirable.

The light-emitting diode lighting apparatus of the present embodiment 4 can deal with the case that requires a large number of LEDs to achieve the high-intensity light emission. It is configured in such a manner as to divide the total number of the LEDs to a plurality of light emitting blocks, and to provide a DC/DC converter for each of the light emitting blocks to carry out light emission. The plurality of LEDs constituting each of the light emitting blocks are connected in series as in the configuration of FIG. 1.

FIG. 7, which supposes the configuration of FIG. 1, is an example of the configuration that divides the DC/DC converter section and light emitting section into three blocks each. In the case of dividing into three blocks, if 45 LEDs are necessary as in the foregoing example, the number of LEDs connected in series in each light emitting block is reduced to one third or 15. This can obviate the need for providing the DC/DC converter for generating the high voltage.

In FIG. 7, a DC/DC converter section 31 to which the DC power supply 1 is applied is constructed from three blocks of a DC/DC converter block 32, a DC/DC converter block 33 and a DC/DC converter block 34. As shown in the DC/DC converter block 32, each DC/DC converter block is composed of two circuits, a boosting circuit 32A and a boosting circuit 32B, connected in parallel. A light emitting section 35 fed from the DC/DC converter section 31 is composed of a light emitting block 36 fed from the DC/DC converter block 32, a light emitting block 37 fed from the DC/DC converter block 33, and a light emitting block 38 fed from the DC/DC converter block 34. As for the DC/DC converter blocks 32, 33, and 34, a control section 39 carries out the switching control of them.

The configuration of the DC/DC converter block 32, DC/DC converter block 33 or DC/DC converter block 34 is the same as that of the DC/DC converter section 2 of FIG. 1. They are each constructed from two flyback boosting circuits connected in parallel. For example, the transformer 32a, switching device 32b, diode 32c, transformer 32d, switching device 32e and diode 32f constituting the DC/DC converter block 32 correspond to the transformer 2a, switching device 2b, diode 2c, transformer 2d, switching device 2e and diode 2f of the DC/DC converter section 2 of FIG. 1, and have the same functions.

As for the configurations of the remaining DC/DC converter block 33 and DC/DC converter block 34, they are the same as the configuration of the DC/DC converter block 32, and their description will be omitted here.

In addition, as for the individual configurations of the light emitting block 36, light emitting block 37 and light emitting block 38, they are the same as the configuration of the light emitting section 3 of FIG. 1. For example, as the light emitting block 36 shows, a plurality of LEDs (36a, 36b, . . . , 36m, 36n: called "LED 36a and the like" from now on) are connected in series, and the cathode side of the series connection is grounded via a resistor 36r. As for the configurations of the remaining light emitting block 37 and light emitting block 38, they are the same as the configuration of the light emitting block 36, and their description will be omitted here.

The control section 39 controls the DC/DC converter blocks 32, 33 and 34 individually in the same manner as the control of the DC/DC converter section 2 of FIG. 1, and controls the entire blocks as well.

For example, as for the DC/DC converter block 32, the control section 39 generates the same frequency switching control signal Sa4 and switching control signal Sb4 in such a manner as to make the voltage across the resistor 36r constant (constant current control), and delivers them to the individual gates (G) of the switching devices 32b and 32e of the DC/DC converter block 32, respectively. The switching control signals Sa4 and Sb4 carry out the switching (on and off) control of the switching devices 32b and 32e. In this case, the switching timing of the on and off control of the switching device 32b is shifted from that of the switching device 32e.

As for the remaining DC/DC converter blocks 33 and 34, the control section 39 carries out the same control as that of the boosting block 32: It generates the same frequency switching control signal Sa5 and switching control signal Sb5, and delivers them to the DC/DC converter block 33; and generates the same frequency switching control signal Sa6 and switching control signal Sb6, and delivers them to the DC/DC converter block 34. In this case, it is the same as for the DC/DC converter block 32 that the phase relationships are shifted between the switching control signal Sa5 and switching control signal Sb5 and between the switching control signal Sa6 and switching control signal Sb6. In addition, the phases are also shifted from each other between the switching control signals Sa4 and Sb4, the switching control signals Sa5 and Sb5, and the switching control signals Sa6 and Sb6.

Next, the operation of FIG. 7 will be described.

The basic operation of the DC/DC converter blocks 32, 33 and 34 is the same as that of the DC/DC converter section 2 of FIG. 1. Thus, its description is omitted here, and the description will be made with placing particular emphasis on the control of the entire blocks by the control section 39 with reference to FIG. 8.

Figure 8:
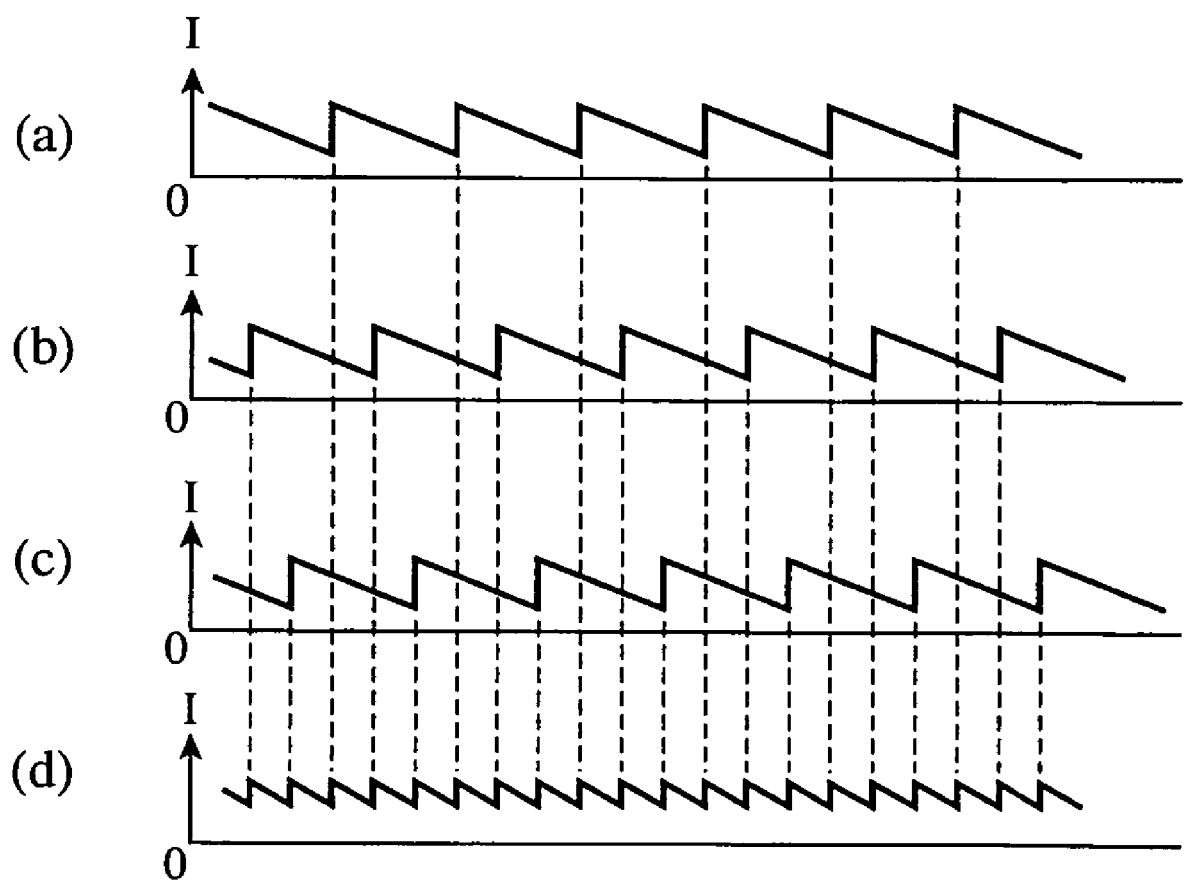
FIG. 8 is a timing chart illustrating the operation of the light-emitting diode lighting apparatus of the embodiment 4 in accordance with the present invention in which (a), (b) and (c) are a waveform diagram of a current flowing from individual DC/DC converter blocks to individual light emitting blocks; and (d) is a waveform diagram of a current obtained by combining the foregoing (a)-(c).

FIG. 8 is a timing chart illustrating the operation of the light-emitting diode lighting apparatus of the embodiment 4 in accordance with the present invention: FIG. 8($a$) is a waveform diagram of a current flowing from the DC/DC converter block 32 to the light emitting block 36 (LED 36a and the like); FIG. 8($b$) is a waveform diagram of a current flowing from the DC/DC converter block 33 to the light emitting block 37; FIG. 8($c$) is a waveform diagram of a current flowing from the DC/DC converter block 34 to the light emitting block 38; and FIG. 8($d$) is a waveform diagram of a current obtained by combining the foregoing (a)-(c).

The control relationships between the control section 39 and each DC/DC converter block 32, 33 or 34 are the same as the control relationships between the control section 4 of FIG. 1 and the DC/DC converter section 2. The control causes the current Ie3 with the waveform of FIG. 8($a$) to flow from the DC/DC converter block 32 to the light emitting block 36; the current Ie4 with the waveform of FIG. 8($b$) to flow from the DC/DC converter block 33 to the light emitting block 37; and the current Ie5 with the waveform of FIG. 8($c$) to flow from the DC/DC converter block 34 to the light emitting block 38.

Here, as shown in FIG. 8($a$), FIG. 8($b$) and FIG. 8($c$), the phases of the current Ie3, current Ie4 and current Ie5 are shifted from each other (by one third of the period (120 degrees), for example). The control section 39 generates the switching control signals Sa4 and Sb4, the switching control signals Sa5 and Sb5 and the switching control signals Sa6 and Sb6 for controlling the current Ie3, current Ie4 and current Ie5 in such a manner as to shift the phases from each other, and carries out the switching control of the switching device 32b and 32e and the like of the DC/DC converter blocks 32, 33 and 34. This can be considered equivalent to that the current with the waveform of FIG. 8(d) obtained by combining the current Ie3, current Ie4 and current Ie5 flows through the entire light emitting section 35 consisting of the light emitting blocks 36, 37 and 38. As compared with the case where the light emitting block consists of one block, the present apparatus can reduce the fluctuations in the current, and the fluctuations in the light emission of the light emitting section 35.

As a result, the foregoing operation can prevent, even in the case where a large number of LEDs are necessary, the intermittent light emission of the LED 36a and the like due to the intermittent LED current, thereby being able to prevent the occurrence of the stroboscopic phenomenon.

Although the DC/DC converter blocks 32, 33 and 34 of FIG. 7 described above are constructed on the basis of the DC/DC converter section 2 (FIG. 1) of the embodiment 1, this is not essential. For example, they can be constructed on the basis of the DC/DC converter section 11 (FIG. 4) of the embodiment 2 or the DC/DC converter section 21 (FIG. 5) of the embodiment 3 instead.

In addition, although the DC/DC converter section 31 and light emitting section 35 of FIG. 7 are each divided into three blocks, the number of the divisions is not limited to three, but any other number is possible for the configuration. In this case, by shifting the phases of the individual currents to be supplied from the individual boosting blocks to the individual light emitting blocks from each other, the light emission of the entire LED 3a and the like can be further prevented from becoming intermittent.

As described above, the present embodiment 4 is configured in such a manner that it divides all the LEDs needed into three light emitting blocks 36, 37 and 38, connects the plurality of LEDs 36a and the like, which constitute the divided light emitting block 36 and the like, in series as in the embodiment 1, and provides the DC/DC converter blocks 32, 33 and 34 corresponding to the divided light emitting blocks 36, 37 and 38, and that the control section 39 carries out the switching control of the individual boosting circuits (32A, 32B and the like) in the DC/DC converter blocks 32, 33 and 34 in such a manner as to shift the phases of the currents Ie3, Ie4 and Ie5 to be supplied to the individual light-emitting diodes in the light emitting blocks 36, 37 and 38 from each other between the boosting circuits constituting the DC/DC converter blocks 32, 33 and 34, and between the DC/DC converter blocks 32, 33 and 34. Thus, the present embodiment 4 can reduce the fluctuations in the light emission of the light emitting section 35, obviate the need for the boosting circuits for generating high voltage, reduce the boosting ratio of the boosting circuit, and suppress the cost increase by eliminating the need for the high-voltage components, thereby being able to prevent the increase in the size of the apparatus due to an increase in the size of the components.

In addition, it goes without saying that the present embodiment 4 can enjoy the advantages described in the embodiment 1.

Embodiment 5

The foregoing embodiments 1-4 are described by way of example of the light-emitting diode lighting apparatus. The light-emitting diode lighting apparatus is applicable as a vehicle light lighting apparatus as will be described below.

As headlights, one of the vehicle lights, there are high-intensity discharge (HID) lamps. The high-intensity discharge lamp has a single light emitting section, and has a low degree of design freedom as the headlights in the design of a car body. Accordingly, increasing the degree of freedom in the design of the car body has been desired.

Compared with the high-intensity discharge lamp, an LED can emit only a small amount of light by itself. However, connecting a plurality of (50, for example) LEDs in series and lighting them simultaneously enable flat headlights and high degree of design freedom.

On the other hand, the LED has a rather high forward voltage drop of about 3 V as described in connection with FIG. 2. Thus, to light the LED blocks connected in series, a boosting power supply is necessary which supplies the voltage equal to or greater than the sum total of the individual forward voltage drops.

In contrast with this, each of the embodiments 1-4 of the light-emitting diode lighting apparatus has a configuration of connecting a plurality of LEDs in series, and supplying power via the DC/DC converters to light all the LEDs connected in series simultaneously. Thus, they are applicable as the lighting apparatus for the headlights of a vehicle using a battery as the power supply and for other lights.

As described above, the present embodiment 5 constructs the vehicle light lighting apparatus using one of the embodiments 1-4 of the light-emitting diode lighting apparatus. Thus, the present embodiment can eliminate the period in which the current flowing through the plurality of LEDs connected in series becomes zero, and prevent the light emission of the LEDs from becoming intermittent (blinking) owing to the intermittent LED current. Accordingly, even when one of the embodiments 1-4 of the light-emitting diode lighting apparatus is applied as the headlights of a vehicle traveling at high speed, it can prevent the stroboscopic phenomenon, thereby being able to provide a desirable light source.

In addition, using one of the embodiment 1-4 of the light-emitting diode lighting apparatus capable of reducing its size and price makes it possible to provide a vehicle light lighting apparatus with its size and price reduced.

INDUSTRIAL APPLICABILITY

As described above, the present invention is applicable as the lighting apparatus of a vehicle and the like, is superior in preventing the occurrence of the stroboscopic phenomenon involved in the intermittent light emission of the LEDs, and is suitable for reducing the size and cost of the apparatus.

What is claimed is:

1. A light-emitting diode lighting apparatus for a vehicle light comprising:
   a DC/DC converter section having a plurality of boosting circuits which boost DC voltage fed from a DC power supply and are connected in parallel;
   a light emitting section having a plurality of light-emitting diodes connected in series; and
   a control section for driving said plurality of boosting circuits at an identical period, and for controlling the individual boosting circuits of said DC/DC converter section in a manner that shifts individual phases of said plurality of boosting circuits from each other such that a current supplied to said plurality of light emitting diodes from said plurality of boosting circuits is never zero, thereby preventing light emitted by the plurality of light emitting diodes from becoming intermittent,
   wherein each of said plurality of boosting circuits include a transformer, a switching device, a diode, and a capacitor, where a drain of said switching device is connected to a tap of said transformer and a first side of said capacitor, a second terminal of said transformer is connected to an anode of said diode, a gate of said switching device is connected to said control section and a second side of said capacitor is connected to ground, and wherein said control section receives a detected voltage signal from the plurality of light emitting diodes and a signal from the tap of said transformer for driving each of said switching devices.

2. The light-emitting diode lighting apparatus according to claim 1, wherein said light emitting section comprises a plurality of light emitting blocks each having the plurality of light-emitting diodes connected in series, and said DC/DC converter section comprises the plurality of DC/DC converter blocks each having a plurality of boosting circuits which boost the DC voltage fed from the DC power supply and are connected in parallel; and said control section controls phases for driving the boosting circuits of said DC/DC converter blocks in a manner that shifts the phases from each other between the individual DC/DC converter blocks.

3. The light-emitting diode lighting apparatus according to claim 1, wherein each of said boosting circuits employs a flyback type circuit configuration that includes a boosting transformer or coil and a switching device for turning on and off voltage supply from said DC power supply to said transformer or coil in response to a control signal of said control section; that causes said transformer or coil to generate flyback voltage by turning on and off the switching device; and that converts the DC voltage fed from said DC power supply to a boosted DC voltage.

4. The light-emitting diode lighting apparatus according to claim 1, wherein each of said boosting circuits employs a circuit configuration that includes a boosting transformer or coil, a switching device for turning on and off voltage supply from said DC power supply to said transformer or coil in response to a control signal of said control section, and a capacitor that resonates with an inductance component of said transformer or coil.

5. A light-emitting diode lighting apparatus comprising a DC/DC converter section having a plurality of boosting circuits which boost DC voltage fed from a DC power supply and are connected in parallel;

a light emitting section having a plurality of light-emitting diodes connected in series; and a control section for driving said plurality of boosting circuits at an identical period, and for controlling the individual boosting circuits of said DC/DC converter section in a manner that shifts individual phases of said plurality of boosting circuits from each other, wherein each of said boosting circuits employs a charge pump type circuit configuration that includes two switching devices turning on and off alternately in response to a control signal of said control section and a capacitor for storing DC voltage fed from the DC power supply; that charges said capacitor with the DC voltage fed from said DC power supply at a time when a first of said two switching devices turns on; and that superimposes charged voltage on the power supply voltage at a time when a second of said two switching devices turns on, thereby converting the DC voltage fed from said DC power supply to a boosted DC voltage.

* * * * *